(12) United States Patent
Domi et al.

(10) Patent No.: US 6,319,461 B1
(45) Date of Patent: Nov. 20, 2001

(54) LEAD-FREE SOLDER ALLOY

(75) Inventors: Shinjiro Domi; Koichi Sakaguchi; Shigeki Nakagaki; Katsuaki Suganuma, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/771,939

(22) Filed: Jan. 30, 2001

Related U.S. Application Data

(63) Continuation of application No. PCT/JP00/03631, filed on Jun. 5, 2000.

(30) Foreign Application Priority Data

Jun. 11, 1999 (JP) ............................................... H11-164737

(51) Int. Cl.$^7$ .................................................... B23K 35/26
(52) U.S. Cl. ........................ 420/557; 148/400; 420/560; 420/561; 420/562
(58) Field of Search ............................. 148/400; 420/557, 420/560, 561, 562

(56) References Cited

FOREIGN PATENT DOCUMENTS

| | | |
|---|---|---|
| 53-124148 | 10/1978 | (JP) . |
| 61269998 | * 11/1986 | (JP) . |
| 64-18981 | 1/1989 | (JP) . |
| 64-71592 | 3/1989 | (JP) . |
| 1-95893 | 4/1989 | (JP) . |
| 01095893 | * 4/1989 | (JP) . |
| 2-179386 | 7/1990 | (JP) . |
| 02280911 | * 11/1990 | (JP) . |
| 4-305073 | 10/1992 | (JP) . |
| 08045940 | * 2/1996 | (JP) . |
| 11-77370 | 3/1999 | (JP) . |

* cited by examiner

*Primary Examiner*—Sikyin Ip
(74) *Attorney, Agent, or Firm*—Kanesaka & Takeuchi

(57) ABSTRACT

A lead-free solder alloy substantially contains Sn and Ti, and has a temperature of a liquidus line of not greater than 400° C. The lead-free solder alloy contains no toxic lead and has sufficient bonding strength to oxide materials such as glass and ceramics.

17 Claims, No Drawings

LEAD-FREE SOLDER ALLOY

CROSS REFERENCE TO RELATED APPLICATION

This is a continuation application of PCT/JP00/03631 filed on Jun. 5, 2000.

FIELD OF THE INVENTION

The present invention relates to lead-free solder alloys for soldering oxide materials, such as ceramics and glass, at a low temperature.

BACKGROUND OF THE INVENTION

As a preparation for soldering oxide materials such as ceramics and glass, a process of applying an electroplating or electroless plating, such as gold plating, copper plating, and nickel plating, on the oxide materials is widely known. However, it is expensive and complicated to solder plated surfaces. Therefore, it is desired to develop an economic solder alloy.

To comply with the aforementioned demand, Japanese patent publication 49-22299B and Japanese patent publication 52-21980B disclose Pb—Sn solder alloys which can be directly soldered to glass and ceramics.

However, lead is toxic and has been recognized as hazards to injure human health and to hurt the environment, affecting the ecosystem, so the use of lead poses a problem. The trend to use no lead in solder alloy has been rapidly increased.

The solder alloy disclosed in the above Japanese patent publication 49-22299B is a Pb—Sn—Cd—Sb solder alloy which can be directly soldered to an oxide film material such as glass and ceramics, but includes toxic lead. The lead elutes from the abandoned products using the solder alloy to cause serious problem to the environment when the products are exposed to acid rain.

The solder alloy disclosed in the above Japanese patent publication 52-21980B is a solder alloy containing rare earth metals which is useful for bonding oxide materials such as glass and ceramics. However, the solder alloy has the same problems as above because it contains lead as a main component.

Development has been actively carried out to provide improved lead-free solder alloys especially for mounting electronic components to a printed wiring board. For example, an Sn—Ag—In solder alloy is disclosed in Japanese patent publication 9-326554A, and an Sn—Zn—Bi solder alloy is disclosed in Japanese patent publication 8-164495A. However, their bonding strengths are not enough for oxide materials such as glass and ceramics.

As an example of lead-free solder alloys for soldering metal oxide materials, an Sn—Ag—Al—Zn solder alloy is disclosed in Japanese patent publication 55-36032B. The resultant solder layer easily separates from oxide material such as glass and ceramics because this solder alloy is for soldering metal and therefore the coefficient of thermal expansion of the solder alloy is greatly different from that of the oxide material.

OBJECT AND SUMMARY OF THE INVENTION

The present invention has been made taking the aforementioned prior art into consideration and the object of the present invention is to provide lead-free solder alloys which contain no toxic lead and have sufficient bonding strength to oxide materials such as glass and ceramics.

The present invention is made to provide a solder alloy for bonding oxide materials such as glass and ceramics, wherein the solder alloy contains Ag, Cu, Zn, Al in addition to essential constituents, Sn and Ti, and further contains O wherein O content is defined. It should be noted that each composition for all of the constituents is an average composition in the solder alloy because the lead-free solder alloy of the present invention contains elements such as Zn, Ti, Al which are extremely easy to be oxidized and are easily segregate on the surface of the solder alloy.

A lead-free solder alloy of this invention is characterized by containing Sn and Ti and having a liquidus temperature equal to or less than 400° C.

In lead-free solder alloy of the present invention, the temperature of the liquidus line is preferably not lower than 200° C. in view of long-term stability under the condition that a portion to be soldered is subjected to high temperature.

The temperature of the liquidus line means the temperature at which a lead-free solder alloy of the present invention is completely melted and can be measured by, for example, a differential scanning calorimetry (DSC).

The lead-free solder alloy of the present invention preferably contains at least 0.0001% by weight O as a constituent. More preferably, the content of O is greater than 0.01% by weight.

The lead-free solder alloy of the present invention preferably further contains from 0.1% to 6.0% by weight Ag as a constituent.

The lead-free solder alloy of the present invention preferably further contains from 0.001% to 6.0% by weight Cu as a constituent.

The lead-free solder alloy of the present invention preferably further contains from 0.001% to 1.0% by weight Ti as a constituent.

The lead-free solder alloy of the present invention preferably further contains from 0.001% to 3.0% by weight Zn as a constituent.

The lead-free solder alloy of the present invention preferably further contains from 0.001% to 3.0% by weight Al as a constituent.

The lead-free solder alloy of the present invention preferably further contains at least one element selected from a group consisting of Bi, Si, and Sb in a range not greater than 10% by weight altogether.

The lead-free solder alloy of the present invention preferably further contains from 0.001% to 1.0% by weight Si.

The lead-free solder alloy of the present invention preferably further contains at least one trace constituent selected from a group consisting of Fe, Ni, Co, Ga, Ge, and P in a range not greater than 1.0% by weight altogether.

Preferred Embodiments

The followings are reasons of employing constituents of lead-free solder alloys according to the present invention. The contents of constituents will be represented by weight percent.

Sn (tin) is not toxic and can give good wetting property on materials to be bonded so that Sn is an indispensable constituent for solder alloy. The content of Sn is preferably equal to or more than 90.0%.

Ti (titanium) is extremely easy to be oxidized, but has an advantage in facilitating bonding between oxide materials and the solder alloy. However, addition of Ti increases the liquidus temperature of the solder alloy. If the liquidus temperature exceeds 400° C., the solder alloy has poor workability. It is preferable to add Ti within a range in which the liquidus temperature of the resultant solder alloy does not exceed 400° C. When Sn is used singly as solder, there is a possibility of phase transition due to temperature change and the phase transition may be detrimental to long-term stability. By adding Ti in a suitable amount, the phase transition of the solder alloy can be prevented. The content of Ti is preferably in a range from 0.001 to 1.0%.

O (oxygen) is an indispensable constituent for lead-free solder alloy for soldering oxide materials such as ceramics and glass. By adding a suitable amount of O in the solder alloy, bonding is made on interfaces between the oxide material and the solder alloy via O, thereby increasing the bonding strength of the resultant solder layer. In this case, the content of O is preferably in a range not less than 0.0001%. More preferably, the content of O is in a range not less than 0.01%. However, when an excess amount of O is contained in the solder alloy, oxides may be undesirably produced in the resultant solder layer by the soldering process. Accordingly, the content of O is preferably in a range not greater than 1.5%. The adjustment of the content of O in the solder alloy can be achieved by suitably selecting the concentration of oxygen in the ambient atmosphere where predetermined raw materials are melted to prepare the solder alloy and suitably selecting the melting period of time.

Ag (silver) has a good effect on improving the mechanical strength of the resultant solder alloy. When the content of Ag is less than 0.1%, such effect of improving the mechanical strength is not enough. Addition of Ag in an amount exceeding 6.0% increases the melting point of the resultant solder alloy and produces a lot of Ag—Sn intermetallic compounds, and thus, on the contrary, reduces the mechanical strength. Accordingly, the content of Ag is preferably in a range from 0.1 to 3.5%.

Cu (copper) has a good effect on improving the mechanical strength of the resultant solder alloy, as well as Ag. Addition of Cu in an amount exceeding 6.0% increases the melting point of the resultant solder alloy and produces a lot of Cu—Sn intermetallic compounds, and thus, on the contrary, reduces the mechanical strength. Accordingly, the content of Cu is preferably in a range from 0.01 to 3.0%.

Zn (Zinc) is preferably added by 0.001% or more in the solder alloy in order to improve bonding strength to oxide materials including glass and ceramics. Zn content exceeding 3.0% is not preferable in practice because the resultant solder layer may become friable.

Al (aluminum) is extremely easy to be oxidized just as Ti, but has an advantage in facilitating bond between oxide materials and the solder alloy. When the content of Al is less than 0.001%, the aforementioned advantage is not achieved fully. Addition of Al in an amount exceeding 3.0% increases the hardness of the resultant solder alloy and makes it difficult to ensure heat cycle resistance, and increases the melting point of the solder alloy, so that the solder alloy has poor workability. Accordingly, the content of Al is preferably in a range from 0.01 to 1.0%.

The lead-free solder alloy according to the present invention may contain one or more elements among Bi, Si and Sb in a range not greater than 10%. Bi and Si improve the wettability of the solder alloy. To add Sb improves the appearance of a soldered portion and increases creep resistance of the resultant solder layer. The solder alloy may contain further elements such as Fe, Ni, Co, Ga, Ge, P in a trace amount to improve characteristics of the solder alloy, such as workability and mechanical strength, besides lead-free.

Si content less than 0.001% is too small to have the effect. Si content exceeding 1.0% is too much because it increases the melting point of the solder alloy so that the solder alloy has poor workability. Accordingly, Si content is more preferably in a range from 0.01 to 0.1%.

Moreover, the lead-free solder alloy according to the present invention may optionally contain a suitable amount of In. Addition of In lowers melting point of the solder alloy, and improves wettability and flexibility of the solder alloy, thereby relaxing the stress applied to the interface between the resultant solder layer and oxide material.

Addition of a suitable amount of Fe, Ni, Co, Ga, Ge, P as trace constituent not only increases the bonding strength to glass but also improves the mechanical strength of the resultant solder layer and provides various characteristics for bonding the solder alloy and the glass firmly such as a characteristic for relaxing the distortion of the interface between the glass and the resultant solder layer when cooled, whereby the solder alloy can bond glass surfaces to each other firmly and has no problem of separation due to impact after soldered. In this case, the content of these optional constituents is preferably 1.0% or less.

The lead-free solder alloy according to the present invention can directly solder not only oxide materials such as glass and ceramics but also metals, which are difficult to be soldered because of their oxide films on their surfaces, such as aluminum, titanium, and zirconium. In case of soldering such materials, a device for applying ultrasonic vibration to the solder alloy is preferably employed.

Hereinafter, the present invention will be described referring to concrete examples.

EXAMPLES 1–10

Samples for the examples were prepared as follows. Soda-lime glass plates (50×50×3 mm) were used as materials to be solder-bonded. Lead-free solder alloys made of constituents shown in Table 1 were melted to adhere to the glass plate with using an ultrasonic soldering iron having a tip which vibrates at 60 kHz. The constituents in Table 1 are represented by weight percent.

Bonding property of each lead-free solder alloy to the glass plate was estimated according to the separation of the lead-free solder alloy caused by scraping the resultant solder layer on the glass with a knife. In Table 1, a circle mark (○) of the bonding property shows that more than half of the resultant solder layer remains on the glass plate, and a cross mark (×) shows that the resultant solder layer separates from the glass plate in its entirety.

TABLE 1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Sn | 99.939 | 99.89 | 95.9 | 99.289 | 90.9975 | 99.49 | 99.5 | 96.199 | 97.68 | 94.977 |
| Ti | 0.05 | 0.01 | 0.1 | 0.001 | 0.002 | 0.005 | 0.05 | 0.001 | 0.02 | 0.003 |
| Ag | 0 | 0 | 3.0 | 0 | 0 | 0 | 0.1 | 0 | 1.0 | 0 |

TABLE 1-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Cu | 0.01 | 0 | 0 | 0.7 | 0 | 0 | 0.1 | 0 | 0.5 | 3.0 |
| Zn | 0 | 0 | 0 | 0 | 9.0 | 0 | 0.1 | 3.0 | 0.5 | 2.0 |
| Al | 0 | 0 | 0 | 0 | 0 | 0.5 | 0.1 | 0.3 | 0 | 0 |
| O | 0.001 | 0.1 | 1.0 | 0.01 | 0.0005 | 0.005 | 0.05 | 0.5 | 0.3 | 0.02 |
| Total | 100 | 100 | 100 | 100 | 100 | 100 | 100 | 100 | 100 | 100 |
| Bonding property | ○ | ○ | ○ | ○ | ○ | ○ | ○ | ○ | ○ | ○ |
| Temperature of liquidus line (° C.) | 310 | 250 | 380 | 229 | 203 | 236 | 314 | 210 | 264 | 235 |

As apparent from Table 1, each of samples of these examples has the liquidus temperatures not greater than 400° C., so that the lead-free solder alloy can be soldered to various oxide materials. The lead-free solder alloy contains suitable amounts of constituents so as to increase bonding strength to glass, and additionally to improve various characteristics for bonding the solder alloy and the glass plate firmly, such as mechanical strength of the resultant solder layer and an ability of relaxing the distortion of the interface between the glass plate and the resultant solder layer when cooled, whereby the solder alloy can bond glass plates to each other firmly and has no problem of separation due to impact after soldered.

Comparative Examples 1 and 2

Samples for the comparative examples were prepared as follows. Soda-lime glass plates (50×50×3 mm) were used as materials to be solder-bonded. Lead-free solder alloys made of constituents shown in Table 2 were melted to adhere to the glass plate with using the ultrasonic soldering iron having a tip which vibrates at 60 kHz. The constituents in Table 2 are represented by weight percent.

Bonding property of each solder alloy to the glass plate was estimated according to the separation of the lead-free solder alloy caused by scraping the resultant solder layer on the glass with a knife in the same manner as the cases of Examples 1–10. In Table 2, a circle mark (○) of the bonding property shows that more than half of the resultant solder layer remains on the glass plate, and a cross mark (×) shows that the resultant solder layer separates from the glass plate in its entirety.

TABLE 2

|  | Comparative Example 1 | Comparative Example 2 |
|---|---|---|
| Sn | 96.4 | 99.2 |
| Ti | 0 | 0 |
| Ag | 3.5 | 0 |
| Cu | 0 | 0.7 |
| Zn | 0 | 0 |
| M | 0 | 0 |
| O | 0.1 | 0.1 |
| Total | 100 | 100 |
| Bonding property | X | X |
| Temperature of liquidus line (° C.) | 221 | 227 |

In both comparative example 1 and comparative example 2 shown in Table 2, the content of Ti is out of the scope of the present invention. Therefore, the lead-free solder alloys of the comparative examples have poor bonding strength to the glass plate so that both of the resultant solder layers separate from the glass plates in its entirety.

EXAMPLES 11–20

Samples for the examples were prepared as follows. Soda-lime glass plates (50×50×3 mm) were used as materials to be solder-bonded. Lead-free solder alloys made of constituents shown in Table 3 were melted to adhere to the glass plate with using the ultrasonic soldering iron having a tip which vibrates at 60 kHz. The constituents in Table are represented by weight percent.

Bonding property of each solder alloy to the glass plate was estimated according to the separation of the lead-free solder alloy caused by scraping the resultant solder layer on the glass with a knife in the same manner as the cases of Examples 1–10. In Table 3, a circle mark (○) of the bonding property shows that more than half of the resultant solder layer remains on the glass plate, and a cross mark (×) shows that the resultant solder layer separates in its entirety.

TABLE 3

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Sn | 94.939 | 94.89 | 95.89 | 93.289 | 90.9965 | 99.489 | 99.499 | 96.198 | 97.679 | 94.976 |
| Ti | 0.05 | 0.01 | 0.1 | 0.001 | 0.002 | 0.005 | 0.05 | 0.001 | 0.02 | 0.003 |
| Ag | 0 | 0 | 3.0 | 0 | 0 | 0 | 0.1 | 0 | 1.0 | 0 |
| Cu | 0.01 | 0 | 0 | 0.7 | 0 | 0 | 0.1 | 0 | 0.5 | 3.0 |
| Zn | 0 | 0 | 0 | 0 | 9.0 | 0 | 0.1 | 3.0 | 0.5 | 2.0 |

TABLE 3-continued

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Al | 0 | 0 | 0 | 0 | 0 | 0.5 | 0.1 | 0.3 | 0 | 0 |
| O | 0.001 | 0.1 | 1.0 | 0.01 | 0.0005 | 0.005 | 0.05 | 0.5 | 0.3 | 0.02 |
| Sb | 5 | 0 | 0 | 3 | 0 | 0 | 0 | 0 | 0 | 0 |
| Si | 0 | 0 | 0.01 | 0 | 0 | 0 | 0 | 0 | 0 | 0 |
| Bi | 0 | 5 | 0 | 3 | 0 | 0 | 0 | 0 | 0 | 0 |
| Fe | 0 | 0 | 0 | 0 | 0.001 | 0 | 0 | 0 | 0 | 0 |
| Ni | 0 | 0 | 0 | 0 | 0 | 0.001 | 0 | 0 | 0 | 0 |
| Co | 0 | 0 | 0 | 0 | 0 | 0 | 0.001 | 0 | 0 | 0 |
| Ga | 0 | 0 | 0 | 0 | 0 | 0 | 0 | 0.001 | 0 | 0 |
| Ge | 0 | 0 | 0 | 0 | 0 | 0 | 0 | 0 | 0.001 | 0 |
| P | 0 | 0 | 0 | 0 | 0 | 0 | 0 | 0 | 0 | 0.001 |
| Total | 100 | 100 | 100 | 100 | 100 | 100 | 100 | 100 | 100 | 100 |
| Bonding property | ○ | ○ | ○ | ○ | ○ | ○ | ○ | ○ | ○ |  |
| Temperature of liquidus line (° C.) | 315 | 245 | 390 | 230 | 203 | 236 | 314 | 210 | 264 | 235 |

As apparent from Table 3, the lead-free solder alloys of the samples contain the basic constituents, suitable amounts of additional constituents, and suitable amounts of Fe, Ni, Co, Ga, Ge, P as additional small constituents so as to increase bonding strength and additionally improve various characteristics for bonding the solder alloy and the glass plate firmly, such as mechanical strength of the resultant solder layer and an ability of relaxing the distortion of the interface between the glass and the resultant solder layer when cooled, whereby the solder alloy can bond glass plates to each other firmly and has no problem of separation due to impact after soldered.

INDUSTRIAL APPLICABILITY

As described above, the lead-free solder alloy of the present invention contains no toxic lead, and has a liquidus temperature not greater than 400° C., so that the lead-free solder alloy can be easily soldered to various oxide materials. And the lead-free solder alloy of the present invention suitably contains the basic constituents, additional constituents, and suitable amounts of Fe, Ni, Co, Ga, Ge, P as additional trace constituents so as to increase bonding strength to glass, and additionally to improve various characteristics for bonding the solder alloy and oxide materials including glass firmly, such as mechanical strength itself and an ability of relaxing the distortion of the interface between a glass surface and the solder alloy when cooled, whereby the solder alloy can bond oxide materials including glass and ceramics to each other firmly and is hard to separate after soldered.

What is claimed is:

1. A lead-free solder alloy containing Sn and Ti and having a liquidus temperature not greater than 400° C., and further containing at least 0.001% by weight O.

2. A lead-free solder alloy as claimed in claim 1, wherein a content of O is equal to or more than 0.01% by weight.

3. A lead-free solder alloy as claimed in claim 2, wherein the content of O is in a range from 0.01 to 1.5% by weight.

4. A lead-free solder alloy as claimed in claim 1, wherein a temperature of the liquidus line is not lower than 200° C.

5. A lead-free solder alloy as claimed in claim 1, wherein Sn content is equal to or more than 90.0% by weight.

6. A lead-free solder alloy as claimed in claim 1, wherein Ti content is in a range from 0.001% to 1.0% by weight.

7. A lead-free solder alloy as claimed in claim 1, wherein said lead-free solder alloy further contains from 0.1% to 6.0% by weight Ag.

8. A lead-free solder alloy as claimed in claim 1, wherein said lead-free solder alloy further contains from 0.001% to 6.0% by weight Cu.

9. A lead-free solder alloy as claimed in claim 1, wherein said lead-free solder alloy further contains from 0.001% to 3.0% by weight Zn.

10. A lead-free solder alloy as claimed in claim 1, wherein said lead-free solder alloy further contains from 0.001% to 3.0% by weight Al.

11. A lead-free solder alloy as claimed in claim 1, wherein said lead-free solder alloy further contains at least one element selected from the group consisting of Bi, Si, and Sb in a range not greater than 10% by weight altogether.

12. A lead-free solder alloy as claimed in claim 1, wherein said lead-free solder alloy further contains from 0.001% to 1.0% by weight Si.

13. A lead-free solder alloy as claimed in claim 1, wherein said lead-free solder alloy further contains at least one trace constituent selected from the group consisting of Fe, Ni, Co, Ga, Ge, and P in a range not greater than 1.0% by weight altogether.

14. A lead-free solder alloy as claimed in claim 13, wherein said solder alloy contains Ti, O, at least one element selected from the group consisting of Ag, Cu, Zn and Al, at least one element selected from the group consisting of Bi, Si and Sb, and at least one of said trace constituents, and the balance of said solder alloy is substantially Sn.

15. A lead-free solder alloy as claimed in claim 1, wherein said solder alloy contains Ti, O, and at least one element selected from the group consisting of Ag, Cu, Zn and Al, and the balance of said solder alloy is substantially Sn.

16. A lead-free solder alloy as claimed in claim 1, wherein said solder alloy contains Ti, O, at least one element selected from the group consisting of Ag, Cu, Zn and Al, and at least one element selected from the group consisting of Bi, Si and Sb, and the balance of said solder alloy is substantially Sn.

17. A lead-free solder alloy as claimed in claim 1, wherein said solder alloy contains Ti and O, and the balance of said solder alloy is substantially Sn.

* * * * *